(12) United States Patent
Brownmiller

(10) Patent No.: US 8,783,444 B2
(45) Date of Patent: Jul. 22, 2014

(54) ALIGNMENT ASSEMBLY FOR A MODULAR TOWER DRYER

(71) Applicant: Sukup Manufacturing Company, Sheffield, IA (US)

(72) Inventor: David J. Brownmiller, Mason City, IA (US)

(73) Assignee: Sukup Manufacturing Co, Sheffield, IA (US)

( * ) Notice: Subject to any disclaimer, the term of this patent is extended or adjusted under 35 U.S.C. 154(b) by 0 days.

(21) Appl. No.: 13/684,639

(22) Filed: Nov. 26, 2012

(65) Prior Publication Data

US 2013/0074354 A1      Mar. 28, 2013

Related U.S. Application Data

(63) Continuation-in-part of application No. 13/169,188, filed on Jun. 27, 2011, now Pat. No. 8,668,079.

(51) Int. Cl.
*B65G 47/00* (2006.01)

(52) U.S. Cl.
USPC .......................................... 198/617

(58) Field of Classification Search
None
See application file for complete search history.

(56) References Cited

U.S. PATENT DOCUMENTS

| 1,375,881 | A |   | 4/1921 | Wilsen |
|---|---|---|---|---|
| 3,980,185 | A | * | 9/1976 | Cain ........................... 206/509 |
| 4,563,844 | A |   | 1/1986 | Driedger |
| 5,566,470 | A |   | 10/1996 | Morrison |
| 5,743,510 | A | * | 4/1998 | Johnston ..................... 249/155 |
| 7,000,765 | B2 | * | 2/2006 | Hase et al. .................... 206/503 |
| 7,686,545 | B2 |   | 3/2010 | Hedrick |
| 2004/0159056 | A1 |   | 8/2004 | Hedrick |
| 2007/0056984 | A1 |   | 3/2007 | Hedrick |

FOREIGN PATENT DOCUMENTS

| GB | 532271 | | 8/1939 |
|---|---|---|---|
| GB | 757364 | | 2/1954 |
| JP | 63031930 | A | 2/1988 |
| WO | 2004074109 | A2 | 9/2004 |
| WO | 2005048685 | A2 | 6/2005 |

OTHER PUBLICATIONS

Schlagel, excerpt from Bucket Elevators Installation and Operation Manual, Cambridge, MN USA.
Honeyville Metal, Inc., excerpt from Bucket Elevator Assembly and Service Manual, Topeka, IN USA.
Lambton Conveyor Limited, Bucket Elevators brochure, Florence, ON, Canada.
GSI Group, Inc., Bucket Elevators & Conveyors brochure, Nov. 2008, Assumption, IL USA.

(Continued)

*Primary Examiner* — Gene Crawford
*Assistant Examiner* — Lester Rushin
(74) *Attorney, Agent, or Firm* — Zarley Law Firm, P.L.C.

(57) ABSTRACT

An alignment and bracing assembly and method of using the same to erect a bucket elevator. The assembly has first and second cross braces that are attached to trunking members of a bucket elevator in spaced relation where a plate is secured to each of the cross braces. The plate includes diagonal sections for additional bracing and in addition alignment openings so that alignment pins can be disposed therethrough to align additional sets of trunking members with one another during the erection process. The alignment pins are also used for the erection of a modular tower dryer.

13 Claims, 5 Drawing Sheets

(56) References Cited

OTHER PUBLICATIONS

X-Brace Flange 4859 LEG 10 GA, Bill of Materials, Drawing; Sep. 1996; sheet 1 of 1; Intersystems; Omaha, Nebraska.
PE4859 Elevator 220'-0" D.H.; Bill of Materials; Drawing; Sep. 1996; sheet 1 of 1; Intersystems, Omaha, Nebraska.
Mathews Company, "10' Vacuum Cool Series Tower Dryers", Crystal Lake, IL, www.mathewscompany.com.
ffi Corporation, "Tower Dryers—Modular Tower Drying", Mar. 2010, The GSI Group, LLC, USA, www.fficorp.com.
Brock Grain Systems, "Meyer Tower Dryers Up to 2,650 BPH", www.graindryers.com.
GSI Group, Inc., "Modular Tower Drying", Jan. 2012, GSI Group, Inc., USA, www.gsiag.com.

* cited by examiner

US 8,783,444 B2

ALIGNMENT ASSEMBLY FOR A MODULAR TOWER DRYER

CROSS REFERENCE TO A RELATED APPLICATION

This application is a continuation-in-part of U.S. patent application Ser. No. 13/169,188 filed Jun. 27, 2011.

BACKGROUND OF THE INVENTION

This invention relates to bucket elevators. More specifically the invention relates to an alignment and bracing assembly for use when erecting agricultural square bucket elevators.

Agricultural elevators have been erected for many years. Supports referred to as "trunking" are aligned and erected in spaced relation to provide support to the elevator. Specifically, once a first set of trunking members are in place and square to one another, a second set is placed on top of the first set to erect the elevator. This typically requires individuals during the erection process to use a hand-held alignment pin that aligns a trunking member as that trunking member is lowered into place on a previously erected trunking member. This causes that individual to have one hand on the alignment pin while attempting to use the other hand to help guide the trunking member in place. This is both dangerous and difficult.

In addition, once the square bucket elevator is erected, problems arise because twisting of the trunking occurs causing undesired operational vibration. Currently, in an attempt to prevent this type of vibration square bucket elevators utilize a single piece of angle-iron or cross pieces of angle-iron to provide some stability. In other instances, nothing is done to prevent the vibration. Vibration is a known hazard for the bucket elevators causing wear and durability issues.

Thus, a principal object of the present invention is to provide an assembly that will facilitate the erection of a square bucket elevator.

Another object of the present invention is to provide a method that improves the safety during the erection of a square bucket elevator.

Another object of the present invention is to reduce the vibration of a square bucket elevator.

These and other objects, features, or advantages of the present invention will become apparent from the specification and claims.

BRIEF SUMMARY OF THE INVENTION

Provided is an alignment and bracing assembly for a bucket elevator. The assembly has first and second cross braces that are secured to a first set of trunking members of the bucket elevator in spaced relation. A plate is secured to each of the first and second cross braces to prevent twisting movement of the trunking members and additionally contains openings for receiving alignment pins. The alignment pins can then be utilized in association with a second set of trunking members that similarly have a plate with alignment openings such that the alignment pin when disposed through the openings of each plate aligns the first and second sets of trunking members.

DETAILED DESCRIPTION OF THE PREFERRED EMBODIMENT

Figure 1:
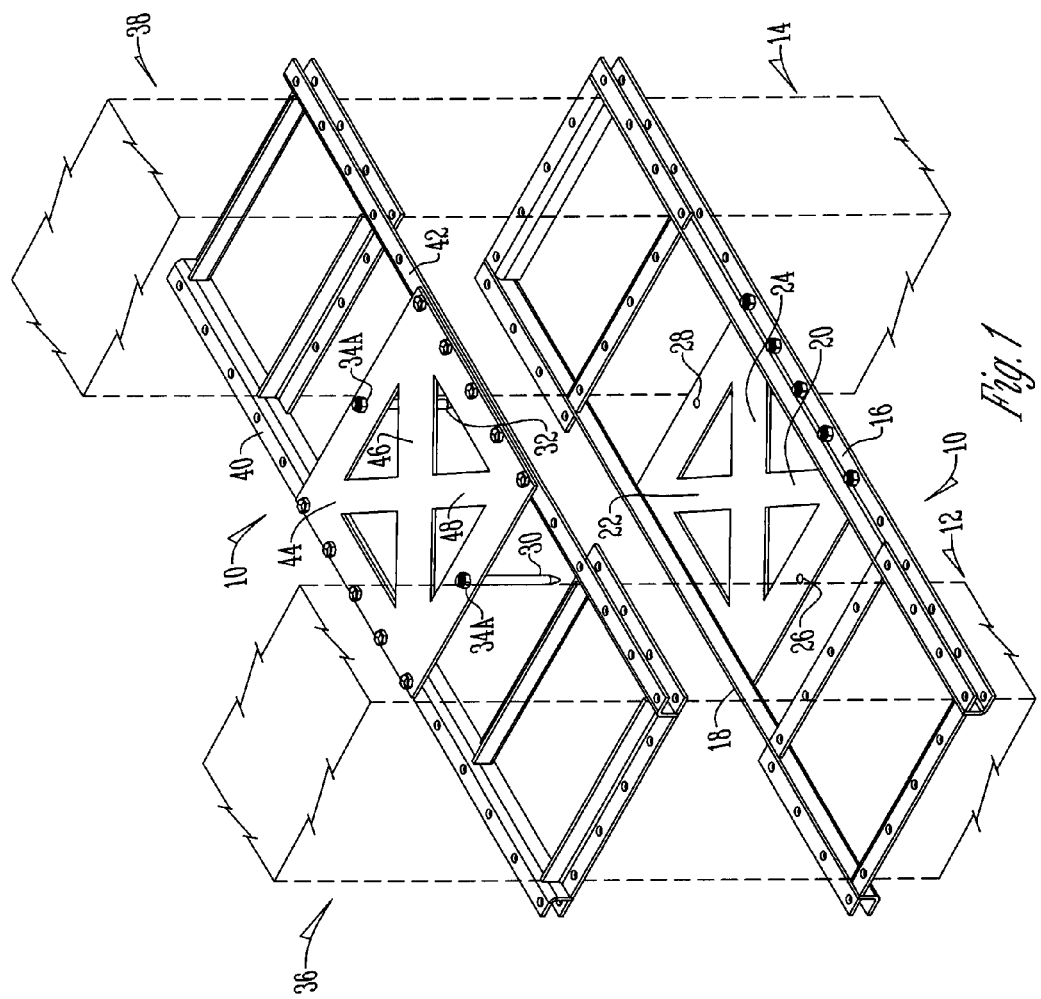
FIG. 1 is a side perspective view of an alignment and bracing assembly.
Figure 2:
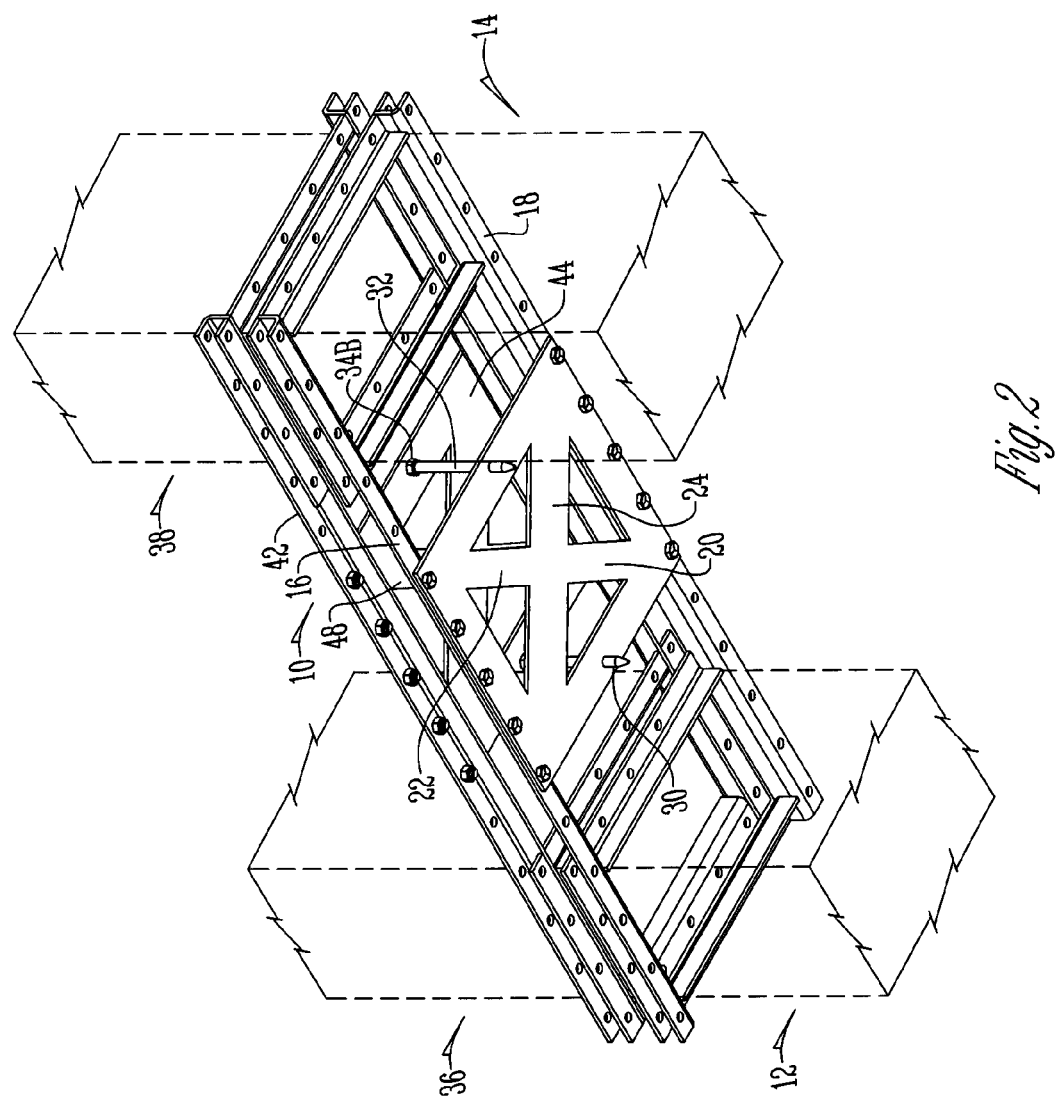
FIG. 2 is a bottom perspective view of an alignment and bracing assembly.

The figures show an alignment and bracing assembly 10 that is utilized during the erection of a bucket elevator. The bucket elevator has a first set of trunking members that includes first and second trunking members 12 & 14. The alignment and bracing assembly is attached to the first and second trunking members 12 & 14 by first and second cross brace members 16 & 18. First and second cross brace members 16 & 18 extend in parallel spaced relation to one another and are placed on the outside of the first and second trunking members 12 & 14 such that the bracing members ensure that the trunking members 12 & 14 are square to one another.

A first plate 20 is secured between the first and second cross brace members 16 & 18. In a preferred embodiment, the plate 20 is bolted to either a top or bottom surface of each of the first and second cross brace members 16 & 18 and extends between the first and second cross braces 16 & 18. The plate 20 has first and second diagonal members 22 & 24 that cross one another to provide a stabilizing structure. Additionally, disposed through the plate are first and second alignment openings 26 & 28 that receive first and second alignment pins 30 & 32.

In one embodiment during the erection process, a second set of trunking 36 & 38 having first and second trunking members 36 & 38 are desired to be stacked on top of the first and second trunking members 12 & 14 of the first set of trunking members in order to erect the bucket elevator. The second set of trunking members 36 & 38 identically utilize an alignment and bracing assembly 10. Specifically, the alignment and bracing assembly 10 of the second set of trunking members 36 & 38 has first and second cross brace members 40 & 42 in parallel spaced relation attached to each of the first and second trunking members 36 & 38. The bracing members receive and secure to a plate 44 having first and second diagonal members 46 & 48 that intersect. Additionally the plate 44 has openings (not shown) for receiving the first and second alignment pins 30 & 32.

Figure 3:
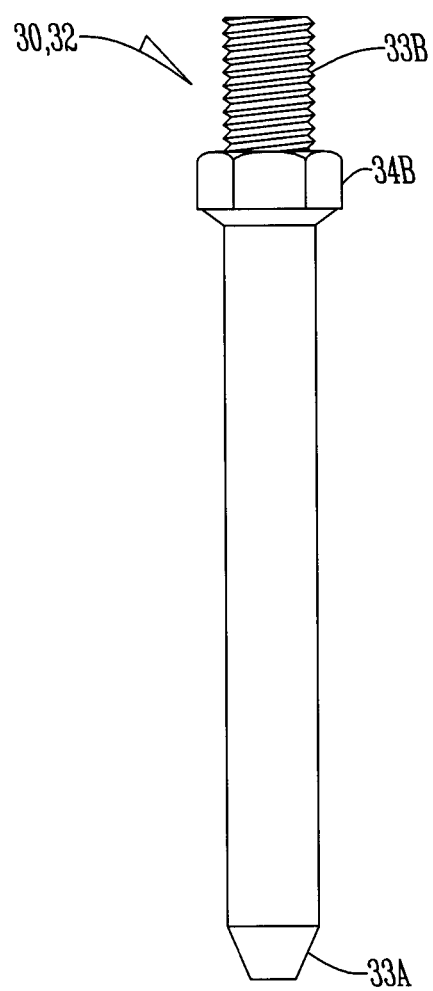
FIG. 3 is a side plan view of an alignment member.
Figure 4:
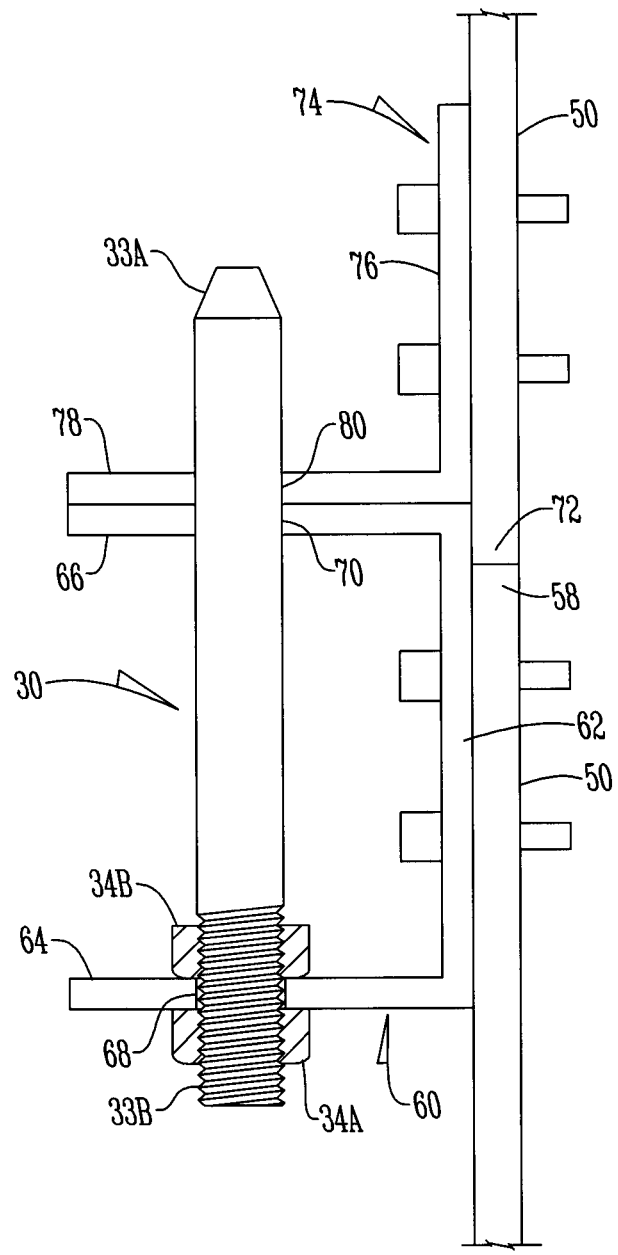
FIG. 4 is a side sectional view of an alignment assembly.
Figure 5:
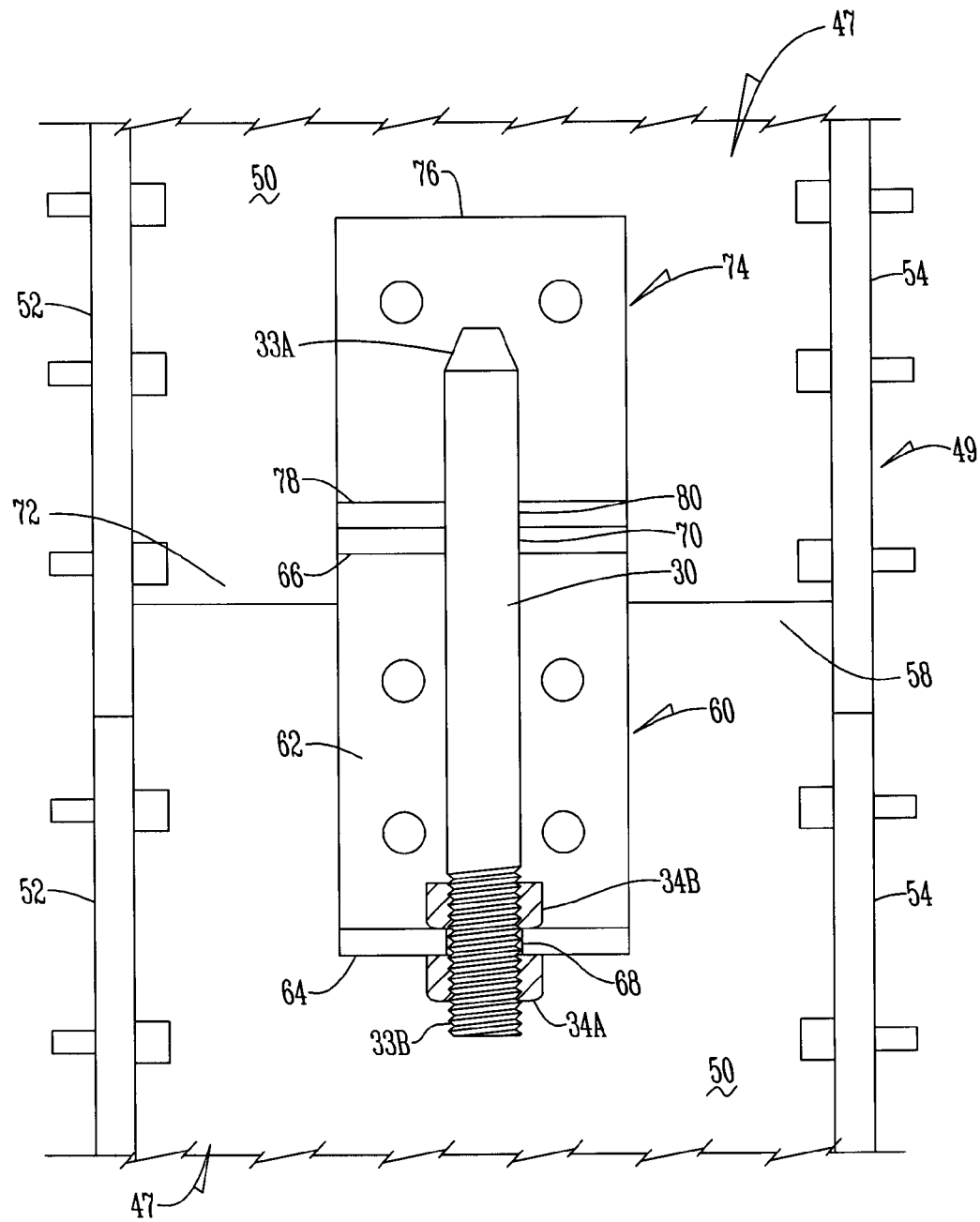
FIG. 5 is a front plan view of an alignment assembly.

As shown in FIG. 3, alignment pins 30 & 32 in a preferred embodiment are rounded having a circular cross section wherein they are of size and shape to fit through first and second alignment openings 26 & 28. The alignment pins 30 & 32 extend from a tapered portion 33A to a top portion 33B that in a preferred embodiment is threaded. Secured between the ends 33A & 33B is an attachment element 34B that in a preferred embodiment is a nut element that is welded to the body of the alignment pins 30 & 32. Thus, in a preferred embodiment the threaded top portion 33B can be disposed through an alignment opening 26 & 28 such that the welded first nut element 34B engages a plate 44 and a second attachment element 34A or nut element can be threaded onto the threads of the top portion 33B against the other side of the plate 44 in order to secure the alignment pins 30 & 32 to the plate, making the need for a worker to hold the alignment pins 30 & 32 unnecessary.

In operation, when a bucket elevator is desired to be erected, the first and second trunking members 12 & 14 are placed square to one another in spaced apart relation. First and second cross braces 16 & 18 are then secured to the first and second trunking members 12 & 14 to ensure that the trunking members are square to one another. In addition, a plate 20 with diagonal members 22 & 24 is secured to the cross braces 16 & 18 to minimize and resist twisting of the trunking members in addition to minimizing vibration during operation.

Once the first set of trunking members 12 & 14 are in place, a second set of trunking members 36 & 38 that have an identical alignment and bracing assembly 10 attached thereto is presented to be lowered on top of the first set of trunking members 12 & 14. Before the placement of the second set of trunking members 36 & 38 on the first set of trunking members 12 & 14, the top portions 33B of the alignment pins 30 & 32 are disposed through the alignment openings and plate 44 such that attachment member 34B that is secured to the body of the alignment pins 30 & 32 engages the plate 44. A second attachment element 34A is then attached to the top portion 33B on threads of the top portion 33B. As the second attachment member 34A is tightened and pressed against the plate 44 the alignment pins 30 & 32 are held in place against the plate 44.

Once the alignment pins 30 & 32 are secured to the plate 44 the second set of trunking members 36 & 38 are lowered onto the first set of trunking members 12 & 14. The tapered portion 33A of the alignment pins allow the placement of the alignment pins 30 & 32 to be inexact when the first and second sets of trunking members 12 & 14, 36 & 38 are aligned where the tapered portion 33A thus acts to align and square the first and second sets of trunking members. While the alignment pins 30 & 32 are described as being first disposed through plate 44, the alignment pins 30 & 32 could be first placed or disposed through plate 20 without falling outside the scope of this disclosure. Thus the alignment pins 30 & 32 can be placed in a downward position from plate 44 or can be placed in an upward position from plate 20 and accomplish the same purpose.

In an alternative embodiment, the alignment pins 30 and 32 are used to align assembled modules 47 during the erection of a modular tower dryer 49. Presently, the assembly and construction of a modular tower dryer 49 is time consuming and labor intensive. When stacking the assembled modules 47 it is important that vertical columns 50 align so that the columns 50 carry the primary load and transfer the load to the ground.

The assembled module 47 includes a generally cylindrical porous plenum wall 52. An outer cylindrical tower wall 54 of porous construction surrounds the plenum wall 52 and is spaced outwardly from plenum wall 52 to define a vertical annular grain drying path. Within the path and connected to walls 52 and 54 are a plurality of vertical columns 50.

Attached to each column 50, adjacent a top edge 58, is a first alignment bracket 60. Alignment bracket 60 has a support section 62 that engages column 50 and also terminates in a pair of flanges 64 and 66 that extend outwardly from support section 62. Each flange 64 and 66 have openings 68 and 70 that are in spaced vertical alignment to one another.

Attached to each column 50, adjacent a bottom edge 72, is a second alignment bracket 74. Bracket 74 is generally L-shaped having a support section 76 that engages column 50 and terminates into a flange 78 that extends outwardly from section 76. Flange 78 has an opening 80. Bracket 60 and bracket 74 are positioned on column 50 in vertical alignment with one another such that openings 68 and 70 are in vertical alignment with opening 80.

To assemble, the tapered portion 33A of alignment pin 30 is inserted through opening 70 of flange 66 of first bracket 60 a sufficient distance such that pin 30 dwells above flange 64. Threaded portion 33B is then inserted through opening 68 in flange 64 such that attachment element 34B, which has a diameter greater than opening 68, engages flange 64. In this position, pin 30 is of sufficient length such that tapered portion 33A extends through an opening 70 and beyond flange 66. Once positioned, second attachment element 34A is threaded onto portion 33B until element 34A engages flange 64 and secures pin 30 to bracket 60.

As a second assembled module 47 is stacked onto a first assembled module 47, the second assembled module 47 is positioned such that opening 80 in the second alignment bracket 74 receives the tapered portion 33A of alignment pin 30 that is secured to the first bracket 60 of the first assembled module. In this way, the vertical columns 50 of the stacked module are vertically aligned and able to carry the primary load of the tower dryer 48 and securely transfer the load to the ground.

Thus presented is an alignment and bracing assembly 10 and method of using the same in order to erect a bucket elevator. As a result of utilizing first and second alignment pins 30 & 32 that can be attached to a plate element 20 or 44, an assembler has both hands free during the assembly of the first and second sets of trunking members providing increased safety for the assembler and facilitates proper alignment. Specifically, the first and second alignment pins also cause perfect alignment between the first and second sets of trunking members while the cross braces 16 & 18 and 40 & 42 ensure that the trunking members are square to one another. In addition, because of the cross brace members and plate arrangement a more rigid final bucket elevator is presented that reduces vibration resistance during operation of the bucket elevator. Thus at the very least all the stated objectives have been met.

It will be appreciated by those skilled in the art that other various modifications could be made to the device without the parting from the spirit and scope of this invention. All such modifications and changes fall within the scope of the claims and are intended to be covered thereby.

What is claimed is:

1. A modular grain storage or drying device formed of a plurality of vertically stacked modules having an alignment assembly, comprising:
    a first module having an exterior wall;
    a second module having an exterior wall;
    the first module having a first column having a first alignment bracket;
    the first alignment bracket having a support section that engages the first column, and an alignment pin having a tapered portion at one end, the alignment pin secured to the first alignment bracket;
    the second module having a second column having a second alignment bracket;
    the second alignment bracket having an opening;
    wherein when the first module and the second module are stacked the opening of the second alignment bracket receives the alignment pin.

2. The modular grain storage or drying device of claim 1 wherein the first alignment bracket is positioned adjacent a top edge of the first column and the second alignment bracket is positioned adjacent a bottom edge of the second column.

3. The modular grain storage or drying device of claim 1 wherein the first bracket and the second bracket are in vertical alignment.

4. The modular grain storage or drying device of claim 1 wherein the second bracket has a support section that engages the column and terminates in a flange that extends outwardly from the support section.

5. The modular grain storage or drying device of claim 1 wherein the alignment pin has a threaded portion and is secured to the first alignment bracket by a first attachment element and a second attachment element.

6. The modular grain storage or drying device of claim 1 wherein the first alignment bracket has a pair of flanges with an opening therein and the second alignment bracket has a flange with an opening therein, such that when the first module and the second module are stacked the openings in the flanges of the first alignment bracket and the opening of the second alignment bracket are spaced in vertical alignment with one another.

7. A modular grain drying device formed of a plurality of vertically stacked modules having an alignment assembly, comprising:
   a first module having an exterior wall and a plenum wall in spaced alignment thereby forming a grain drying path;
   a second module having an exterior wall and a plenum wall in spaced alignment thereby forming a grain drying path;
   the first module having a first column having a first alignment bracket;
   the first alignment bracket having a support section that engages the first column, and an alignment pin having a tapered portion at one end, the alignment pin secured to the first alignment bracket;
   the second module having a second column having a second alignment bracket;
   the second alignment bracket having an opening;
   wherein when the first module and the second module are stacked the opening of the second alignment bracket receives the alignment pin.

8. The modular grain drying device of claim 7 wherein the first alignment bracket is positioned adjacent a top edge of the first column and the second alignment bracket is positioned adjacent a bottom edge of the second column.

9. The modular grain drying device of claim 7 wherein the first bracket and the second bracket are in vertical alignment.

10. The modular grain drying device of claim 7 wherein the second bracket has a support section that engages the column and terminates in a flange that extends outwardly from the support section.

11. The modular grain drying device of claim 7 wherein the alignment pin has a threaded portion and is secured to the first alignment bracket by a first attachment element and a second attachment element.

12. The modular grain drying device of claim 7 wherein the first alignment bracket has a pair of flanges with an opening therein and the second alignment bracket has a flange with an opening therein, such that when the first module and the second module are stacked the opening in the flanges of the first alignment bracket and the opening of the second alignment bracket are spaced in vertical alignment with one another.

13. A method of assembling a modular grain storage or drying device formed of a plurality of vertically stacked modules having an alignment assembly, comprising:
   providing a first module having an exterior wall and a first alignment bracket connected to the first module;
   connecting an alignment pin having an elongated shaft and a tapered end to the first alignment bracket;
   providing a second module having an exterior wall and a second alignment bracket connected to the second module, the second alignment bracket having an opening;
   stacking the first module and the second module in vertical alignment with one another;
   aligning the alignment pin of the first alignment bracket with the opening of the second alignment bracket;
   receiving the alignment pin of the first alignment bracket in the opening of the second alignment bracket.

\* \* \* \* \*